US005413831A

United States Patent [19]

Nemoto et al.

[11] Patent Number: 5,413,831

[45] Date of Patent: May 9, 1995

[54] BELLOWS AND PROCESS FOR PRODUCTION THEREOF

[76] Inventors: Takeshi Nemoto; Teruko Nemoto, both of 19-10, Kotsubo 5-chome, Zushi 249, Japan

[21] Appl. No.: 49,520

[22] Filed: Apr. 19, 1993

Related U.S. Application Data

[62] Division of Ser. No. 899,633, Jun. 16, 1992, Pat. No. 5,316,819.

[51] Int. Cl.[6] .......................... G12B 1/04; B32B 3/02

[52] U.S. Cl. .................................... 428/43; 428/131; 493/940; 29/454

[58] Field of Search .......................... 29/454; 493/940; 428/126, 130, 36.92, 43, 136, 131

[56] References Cited

FOREIGN PATENT DOCUMENTS 62-158640 11/1985 Japan .............................. B65D 5/32
62-158641 11/1985 Japan .............................. B65D 5/32

*Primary Examiner*—Alexander S. Thomas
*Attorney, Agent, or Firm*—Trexler, Bushnell, Giangiorgi & Blackstone, Ltd.

[57] ABSTRACT

A bellows is formed from a plurality of elemental pieces. A plurality of the elemental pieces are integrally formed as a one piece of continuous sheet material defining borders between the pieces. The border includes partial discontinuous for identifying folding portion of the pieces for mating adjacent pieces. Continuity of adjacent pieces is maintained by bridging portions which serves as positioning means for precisely mating the adjacent pieces for connecting peripheral edges for completing the bellows.

3 Claims, 2 Drawing Sheets

1
3
3a
3b
3c
4
4a
4b
4c
5
5a
5b

BELLOWS AND PROCESS FOR PRODUCTION THEREOF

This is a divisional of copending application Ser. No. 07/899,633, filed on Jun. 16, 1992, now U.S. Pat. No. 5,316,819.

BACKGROUND OF THE INVENTION

Field of the Invention

The present invention relates generally to a bellows, process in production of the bellows. More particularly, the invention relates to a bellows for expandably and/or contractibly insulating movable portions of machineries so as to protect from external disturbance factor, such as dust, light beam, humidity and so forth.

Description of the Background Art

In the prior art, as shown in FIG. 2, a sheet material 1 which is formed by coating a neoprene rubber on a woven fabric, is pressed into a plurality of essentially channel-shaped pieces 2, 2*a*, 2*b*, 2*c*, . . . having an outer edge 5 and an inner edge 4 by completely cutting along cut edges 4*a* and 5*c*, as shown in FIG. 2(*b*). Then, each two pieces 2, 2*a* and 2*b*, 2*c*, . . . are piled together. The mating inner edges 4 of the piled pieces are sewn along a sewing lines 4*c* to form an individual bellows segment, as shown in FIG. 2(*c*). The sewing along the sewing line 4*c* which extend along the inner edge 4 will be hereafter referred to as "inside sewing". After completing the inside sewing process for forming necessary number of bellows segments, adjacent pieces, such as pieces 2*a* and 2*b* in FIG. 2(*d*) of the adjacent bellows segments are sewn along sewing lines 5*b* which extend along the outer edge 5 for connecting adjacent bellows segments. The sewing along the sewing line 5*b* will be hereafter referred to as "outside sewing". Therefore, in the final product of the bellows, the inside sewing and the outside sewing are provided in alternating fashion.

It is possible to provide tack bonding along respective sewing lines 4*c* and 5*b* upon piling pieces in advance of performing sewing process in order to facilitate sewing process and to prevent the piled pieces from causing displacement during sewing process.

In such conventional process, since the pieces are completely separated, piling of respective individual pieces with precisely aligning peripheral edges either for the inside sewing process or for the outside sewing process, is time consuming and labor intensive work. Furthermore, since displacement in the piled pieces during sewing process may results in distortion of the final products, relatively high skill of the experienced labor is required for performing sewing process to make the sewing process as cost intensive process as well. Although tack bonding along the sewing lines may prevent the problem of causing displacement during sewing process, process of tack bonding is also time consuming and labor intensive work.

SUMMARY OF THE INVENTION

Therefore, it is an object of the present invention to provide a bellows, and process in production of the bellows, which can provide complete solution for the difficulties or disadvantages in the prior art.

Another object of the present invention is to provide a bellows and process for producing thereof which can reduces work load and process time in production and does not require substantial skill in performing sewing process without causing displacement of pieces which results in distortion of the final product.

In order to accomplish the above-mentioned and other objects, a bellows comprises a sheet material defining by a plurality of series of pieces of the same configuration of the same size, each piece having outer edges adapted to define the external configuration of the bellows and a recessed portion defined by inner edges and defining a configuration of the inner space of the bellows, an inner connecting portion extending along said inner edges of mating adjacent pieces for interconnection therebetween, a pair of first bridging portions extending over said mating adjacent pieces at positions in the vicinity of both ends of said inner connecting portion, said pair of first bridging portions being formed integrally with the associated portion of both of said mating adjacent pieces for maintaining integrity therebetween, an outer connecting portion extending along said outer edges of the mating adjacent pieces for interconnection therebetween, and a second bridging portion extending over said mating adjacent pieces at a position in the vicinity of said outer connecting portion, said second bridging portion being formed integrally with the associated portion of both of said mating adjacent pieces for maintaining integrity therebetween.

In the preferred construction, said pair of first bridging portions may be formed by terminating cut edge at mid-way. In this case, the cut edge may extend transversely with respect to the longitudinal direction of said one piece of sheet material and terminated at positions in the vicinity of both ends of said inner connecting portion. Also, in the preferred construction, the second bridging portion may be formed by a perforation transverse to the longitudinal direction of said one piece of sheet material and defining border between adjacent pieces.

According to another aspect of the invention, a sheet material for forming a bellows defining by a plurality of series of pieces of the same configuration of the same size, each piece having outer edges adapted to define the external configuration of the bellows and a recessed portion defined by inner edges and defining a configuration of the inner space of the bellows, a pair of first bridging portions provided at a first border being connected a first piece with second piece adjacent thereto, and a second bridging portion provided at a second border being connected a first piece with a third piece adjacent thereto at opposite side to said second piece.

In this case, the first border further may include a cut edge extending transverse to a longitudinal direction of said sheet material and terminated at the intermediate position with leaving said pair of first bridging portions. Also, the second border is defined by a perforation.

According to a further aspect of the invention, a process for producing a bellows comprises the steps of providing an elongated continuous sheet having a longitudinal axis, forming a sheet material by defining a plurality of series of pieces of the same configuration of the same size, each piece having outer edges adapted to define the external configuration of the bellows and a recessed portion defined by inner edges and defining a configuration of the inner space of the bellows, a first piece being bordered from adjacent second piece through a first border including at least one bridging portion extending over said first and second pieces and integrally connected to both of said first and second pieces, and said first piece being further bordered from adjacent third piece positioned at opposite side to said second piece through a second border including at least one bridging portion extending over said first and third pieces and integrally connected to both of said first and third pieces, mating respective of adjacent pieces by folding said sheet material at respective of said first and second borders, and rigidly connecting respective of said inner edges and outer edges of said mating adjacent pieces.

In the construction of the present invention, since the elemental pieces of the bellows are formed in series with maintaining integrity, those pieces are folded at respective borders to mate with the adjacent pieces during process of production.

Upon folding, the respective of the bridging portions may serve as means for identifying the portion to be folded and as means for positioning the piece relative to the adjacent piece for allowing precise positioning of the pieces with avoiding possibility of offsetting or displacement during process for connecting the mating pieces. This substantially reduces labor work and process time required for precisely mating the pieces in comparison with the process in the prior art.

BRIEF DESCRIPTION OF THE DRAWINGS

The present invention will be understood more fully from the detailed description given herebelow and from the accompanying drawings of the preferred embodiment of the invention, which, however, should not be taken to limit the invention but are for explanation and understanding only.

In the drawings.

DESCRIPTION OF THE PREFERRED EMBODIMENT

Figures 1A, 1B, 1C, 1D:
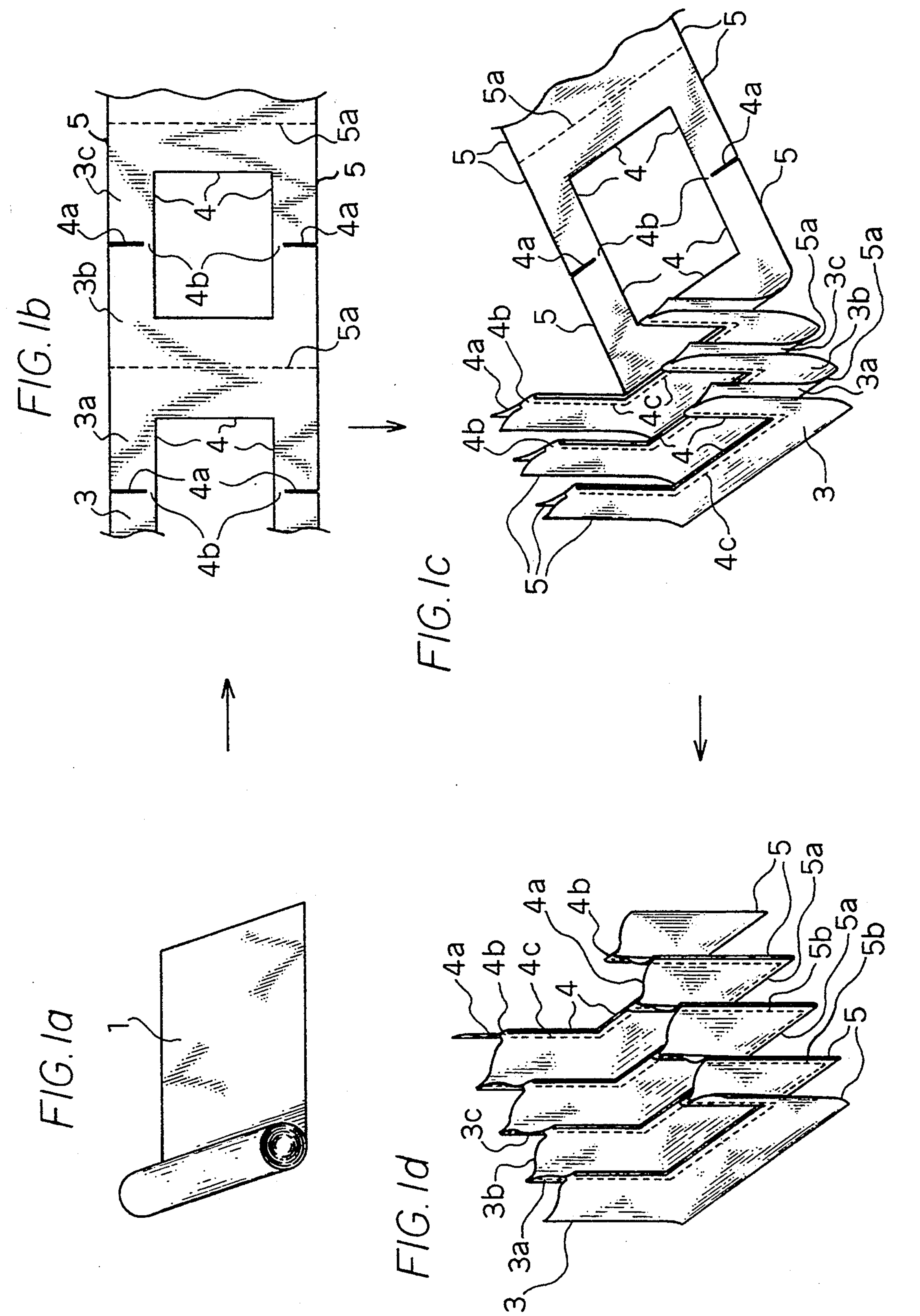
FIG. 1 shows the preferred process in production of a bellows according to the present invention, in which FIG. 1(*a*) shows a sheet material, from which the preferred construction of bellows is formed, FIG. 1(*b*) is a plan view of the sheet material after pressing process, FIG. 1(*c*) is a perspective view showing manner of inside sewing in the preferred process according to the invention, and FIG. 1(*d*) is a perspective view showing manner of outside sewing in the preferred process according to the invention.
Figure 2B:
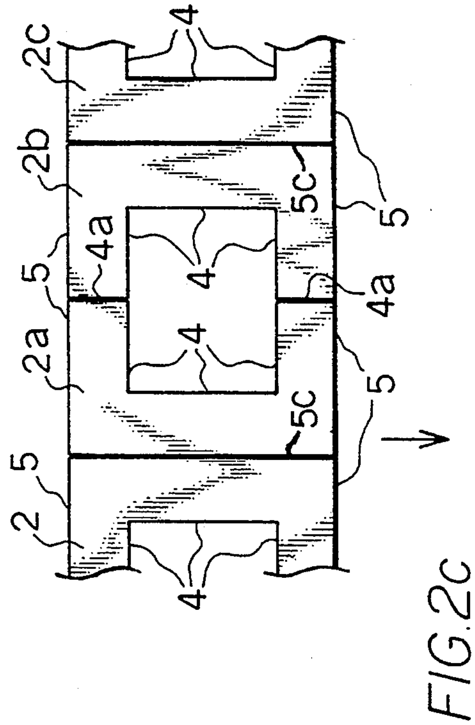
FIG. 2 shows the typical process in production of a bellows in the prior art, in which FIG. 2(*a*) shows the material of sheet identical to that in FIG. 1(*a*), FIG. 2(*b*) is a plan view of the sheet material after pressing process, FIG. 2(*c*) is a perspective view showing the manner of inside sewing in the prior art, and FIG. 2(*d*) is a perspective view showing manner of outside sewing in the prior art.
Figure 2C:
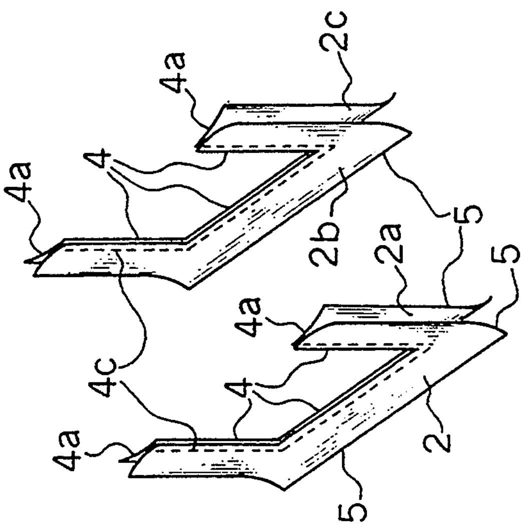
Figure 2A:
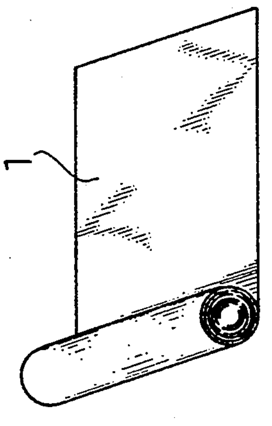
Figure 2D:
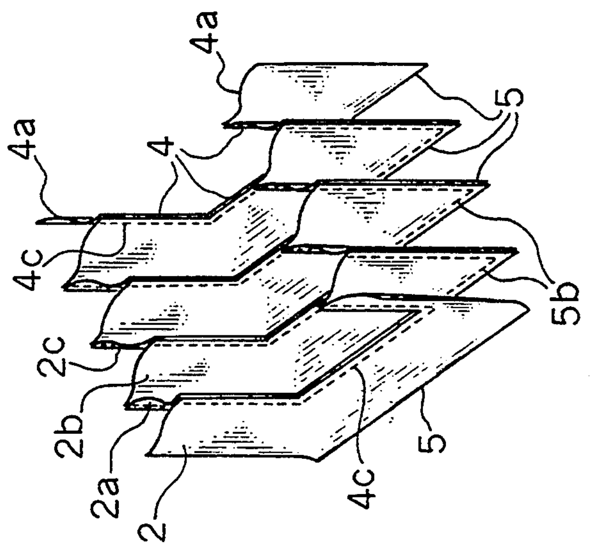

Referring now to FIG. 1, the preferred process of production of a bellows according to the present invention will be discussed in an order of process steps. Similarly to the prior art, a sheet material 1 is produced by coating neoprene rubber on a woven fabric, for example, and may be provided in a form of a roll of sheet material, as shown in FIG. 1(*a*). Although the specific material of the sheet material 1 is mentioned as above, it is possible to use any suitable material for forming an elastically deformable or expandable bellows. The sheet material 1 is subject pressing process to be formed into a pressed sheet as shown in FIG. 1(*b*).

The pressed sheet in the present invention includes series of mutually connected pieces 3, 3*a*, 3*b*, 3*c*, . . . As in the prior art, each piece 3, 3*a*, 3*b*, 3*c*, . . . is formed into essentially channel-shaped configuration. Each piece 3, 3*a*, 3*b*, 3*c*, . . . is defines by a partial cut edge 4*a* at one longitudinal edge and a perforated edge 5*a* at the other longitudinal edge. As can be seen from FIG. 1(*b*), the cut edge 4*a* is terminated at the lateral mid-way between an outer edge 5 and an inner edge 4 with a leaving connecting strip 4*b*. With the construction set forth above, the individual pieces 3, 3*a*, 3*b*, 3*c*, . . . are connected to the adjacent pieces through the connecting strip 4*b* at one longitudinal edge and through the perforated edge 5*a* at the other longitudinal edge to form a series of sheet.

In the preferred construction, the depth of the cut edge 4*a* may be selected so that it may terminate at a position inside of an inner sewing line 4*c* so that full expansion stroke of the final bellows can be provided.

To perform the inside sewing process, the series of pieces are folded at every connecting strips 4*b* so that every other pieces 3, 3*a* and 3*b*, 3*c*, . . . mate each other with aligning respective of the inner and outer edges 4 and 5. During this folding process, since the connecting strips 4*b* serve as folding marks for allowing folding at precisely desired positions and as positioning means for precisely positioning the mating pieces, offsetting or displacement between the mating pieces will never caused. After completion of folding process, the inside sewing is performed for every mating inner edges 4 along the inner sewing line 4*c*.

After completing the inside sewing process, the outside sewing process as shown in FIG. 1*d* is performed for respective of the pieces 3, 3*a*, 3*b*, 3*c*, . . . . In the outside sewing process, respective pieces 3, 3*a*, 3*b*, 3*c*, . . . are folded at the perforated edges 5*a* so as to be mated with the adjacent pieces. In this folding process, since the folding positions can be precisely defined by the perforated edges 5*a* and accurate positioning can be provided by the combination of the sewn inner edges 4 and the perforated edges, precise piling of the pieces can be obtained. Then, outside sewing is performed along outer sewing lines 5*b* which extends along the outer edges 5 and the perforated edges 5*a*. By completion of the outside sewing process, the production of the bellows is completed.

As can be appreciated herefrom, since the essentially channel-shaped individual pieces, in the present invention, forms a series of at least partially connected sheet, the three points connection, i.e. at the connecting strips 4*b* and the perforated edge 5*a*, between adjacent pieces contributes for precise positioning of mating pieces with avoiding relative offset or displacement throughout the production processes including sewing processes. The preferred process thus allows substantial reduction of the labor work and process time with avoidance of distortion in the final products for higher yield. This clearly improves production efficiency. Furthermore, because of the three points connection facilitating positioning of the mating pieces throughout the production process, it does not require substantial skill in performing sewing process and thus contributes lowering of production cost. In addition, since the respective pieces maintain connection through the connection strips and the perforated edges even after completion of the production process, it may assist tight fitting of the adjacent pieces even when loosing of the sewn portion is caused and may avoid entry of the dust, dirt and so forth into the interior space.

While the present invention has been disclosed in terms of the preferred embodiment, various modifications, changes or reconstruction of the shown embodiment will be obvious to those skilled in the art without departing from the principle of the invention as defined in the appended claims. Therefore, the present invention should be understood to include all possible and obvious modifications, changes, omissions and reconstructions derived from the shown embodiment.

For example, as set out above, the sheet material is not specified to the woven fabric with the neoprene coating. Also, the perforation employed at the border between the adjacent pieces can be replaced with the cut outs with leaving necessary width of the connecting strip or strips in the similar manner to that for the cut edges 4*a*. The perforation may also be replaced with one or more impression for defining the folding portion. In addition, the way of connecting the pieces should not be limited to sewing but can be any suitable ways, such as bonding, high frequency welding, or so forth. The way to connect the pieces as well as the material to form the bellows may be selected depending upon specific application of the bellows to be produced. Also, the order of connection of the adjacent pieces may not be specified to begin with the connection for the inner edges but may be started from the connection for the outer edges. Furthermore, although the foregoing discussion is made for production of the bellows formed with a plurality of essentially rectangular or square pieces, the present invention is equally applicable for the bellows with any different configurations of pieces, such as semicircular configuration.

What is claimed is:

1. A sheet material for forming a bellows comprising:

a plurality of series of pieces of the same configuration of the same size, said plurality of pieces including first, second and third pieces arranged in a manner that said first and second pieces being adjacent to each other with respective mating first sides thereof and said second and third .pieces being adjacent to each other with mating second sides opposite to said first sides thereof;

each piece having outer edges adapted to define the external configuration of the bellows and a recessed portion defined by inner edges and defining a configuration of the inner space of the bellows, a pair of first bridging portions provided to at least partially define a first border between said adjacent first and second pieces for connecting respective first sides of said first and second pieces and a second bridging portion provided to at least partially define a second border between said adjacent second and third pieces for connecting respective second sides opposite to said first sides of said second and third pieces.

2. A sheet material as set forth in claim 1, wherein said first border further includes a cut edge extending transverse to a longitudinal direction of said sheet material.

3. A sheet material as set forth in claim 1, wherein said second border is defined by a line of perforations.

* * * * *